United States Patent [19] [11] Patent Number: 4,626,398
Vetter et al. [45] Date of Patent: Dec. 2, 1986

[54] PROCESS FOR THE PRODUCTION OF EXTRUDED WEB MULTIPLE PANEL WITH UNDULATED WEBS

[75] Inventors: Eng H. Vetter, Rossdorf; Karl-Heinrich Schanz, Muehltal, both of Fed. Rep. of Germany

[73] Assignee: Roehm GmbH Chemische Fabrik, Darmstadt, Fed. Rep. of Germany

[21] Appl. No.: 719,240

[22] Filed: Apr. 2, 1985

[30] Foreign Application Priority Data

Apr. 19, 1984 [DE] Fed. Rep. of Germany ....... 3414832
Jul. 14, 1984 [DE] Fed. Rep. of Germany ....... 3426060

[51] Int. Cl.$^4$ ............................................. B29C 47/90
[52] U.S. Cl. ..................................... 264/566; 264/508; 264/177 R; 264/177.1; 264/209.3; 264/209.4; 264/210.2; 425/326.1; 425/388
[58] Field of Search ............ 264/177 R, 167, 560–568, 264/558, 209.2, 209.8, 209.3, 506, 508, 210.2; 425/465, 326.1, 131.1, 320, 388, 396, 391

[56] References Cited

U.S. PATENT DOCUMENTS

| 3,019,483 | 2/1962 | Schultheiss | 264/167 |
| 3,668,288 | 6/1972 | Takahashi | 264/566 |
| 3,673,032 | 6/1972 | Komoly | 264/167 |
| 3,692,889 | 9/1972 | Hetrich | 264/209.3 |
| 3,812,230 | 5/1974 | Takahashi | 264/560 |
| 3,888,617 | 6/1975 | Barnett | 425/326.1 |
| 4,181,487 | 1/1980 | Kessler | 425/388 |
| 4,211,525 | 7/1980 | Vetter | 264/568 |
| 4,261,777 | 4/1981 | Vetter et al. | 264/565 |

FOREIGN PATENT DOCUMENTS

| 2734464 | 2/1979 | Fed. Rep. of Germany . | |
| 49-35065 | 9/1974 | Japan | 264/177 R |
| 457829 | 8/1968 | Switzerland . | |
| 1130598 | 10/1968 | United Kingdom | 264/177 R |

Primary Examiner—Jeffery Thurlow
Attorney, Agent, or Firm—Oblon, Fisher, Spivak, McClelland & Maier

[57] ABSTRACT

Extruded web multiple panels are produced with undulated webs by extrusion of a thermoplastic material by a device including an extruder, a slotted die connected thereto which comprises core pieces in the die slot for forming the webs, a movable mold channel placed downstream of the slotted die, and a removal device. The undulation of the webs is produced by friction forces rhythmically alternating in direction crosswise to the extrusion direction. The friction forces are allowed to act in the mold channel on the extrudate in an area where it is still above its softening temperature. The friction forces are produced either by a rhythmic crosswise movement of the entire mold channel or by movable sections of the mold channel walls of a special mold channel.

9 Claims, 8 Drawing Figures

PROCESS FOR THE PRODUCTION OF EXTRUDED WEB MULTIPLE PANEL WITH UNDULATED WEBS

FIELD OF THE INVENTION

The invention relates to an extruded web multiple panel of thermoplastic material with webs undulated in the extrusion direction and a process and a device for the production of such a panel.

BACKGROUND OF THE INVENTION

Web multiple panels consisting of two parallel planar outside walls (and, optionally, inner walls parallel to them) and integral webs placed between the outside walls have achieved considerable technical importance as light, heat-insulating, rigid glazing or roofing material. Because of the stiffening action of the webs, the web multiple panels can be laid freely over great support spans in the web direction. However, the stiffness crosswise to the web direction leaves something to be desired. Web multiple panels with undulated webs in the extrusion direction do have a higher crosswise stiffness. However, because of the great equipment costs for their production, they have not achieved any technical importance so far.

A process for producing hollow profile panels with undulated intermediate webs by use of a special extrusion die is known from Swiss Pat. No. 457,829. The undulated arrangement is achieved by rhythmic lateral movement of the cores between which the webs are formed within the die orifice. While the intermediate webs within the panel area are thus extruded in an undulated form, the side web is produced as a full profile of varying width, which causes a considerable consumption of material and undesirable stresses in the material. Also, the rhythmic movement of the die core provided with the core piece is technically costly.

Another principle for undulation of the webs is shown in German Patent Document DE-OS No. 27 34 464. Here also a specially designed extrusion die is necessary. By a rhythmic variation of the flow resistance of the molding material in the die orifice during extrusion of the hollow extrudate, the outside wall compartments of the web multiple panel which are located between the attachment sites of the webs are alternately made thicker and thinner so that in each case a thick and thin zone are next to each other in neighboring compartments. Then the extrudate in thermoplastic state is stretched biaxially or triaxially, whereby the thick zones are stretched less than the thin zones. Thus, during stretching the web moves to different distances from one another, which leads to an undulation in the rhythm of the thick and thin zones that follow one another. In this case, the webs that are next to one another are always undulated in opposite direction.

OBJECTS OF THE INVENTION

A principal object of the invention is to simplify the production of web multiple panels of thermoplastic material with undulated webs.

A further object of the invention is to perform the production process with the usual extrusion dies without mechanically moved parts.

A still further object of the invention is to achieve the foregoing objects while at the same time avoiding the disadvantages of the web multiple panels produced according to known processes.

SUMMARY OF THE INVENTION

The invention proceeds from a process for production of extruded web multiple panels by extrusion of a thermoplastic material through a slotted die. The slotted die comprises core pieces longitudinally spaced from one another to form a hollow extrudate. The hollow extrudate is subsequently calibrated and cooled in a mold channel, and the cooled hollow extrudate is removed after it has left the mold channel. According to the invention, to form webs undulated in the extrusion direction, friction forces, rhythmically alternating in direction crosswise to the extrusion direction, are made to act on at least one surface of the hollow extrudate in the mold channel in an area in which the hollow extrudate is still above its softening temperature.

For this purpose, a special mold channel may be used. In such a mold channel, a section of at least one of the mold channel walls of the input area of the mold channel is made to be rhythmically movable in an alternating direction crosswise to the extrusion direction, and the subsequent section of the mold channel wall is made to be stationary. Alternatively, a conventional mold channel may be used. In this case, the conventional mold channel is made to be movable as a whole in the same way.

In both cases, friction forces are exerted on the hollow extrudate crosswise to the extrusion direction by the crosswise movement of the mold channel or the moved sections of the mold channel walls. Thus, the outside walls of a hollow extrudate, adjacent to the moved mold channel walls, are moved with them, as a result of which the webs connected to the outside walls follow a path that is slanted in relation to the extrusion direction. In alternating the direction of movement, the direction of the slanted path is also changed. In this way, by a rhythmic alternation of the direction of movement, an undulating path of the webs is achieved.

The usual slotted dies for the production of web multiple panels without mechanically moved fittings can be used for the process of the invention. Since the technical design of a mold channel is substantially simpler than that of an extrusion die, the installation of movable sections of the mold channel walls entails less technical expenditure than the installation of movable parts in an extrusion die. Also, the crosswise movable arrangement of the entire mold channel is a simple design solution.

In comparison with web multiple panels which are produced according to the prior art by a slotted die with oscillating core pieces, the web multiple panels according to the invention have the advantage that the rim webs have a uniform thickness. As a result, material consumption is reduced, and stresses resulting from greatly different web widths are avoided.

The undulating path of the webs results in the outside wall sections in the area between the lateral edges and the attachment of the next web exhibiting a variable thickness in rhythm with the web undulation. These variations occur by the outside wall area being elongated at the places where the first web inside the hollow shape is farthest from the lateral edge of the web multiple panel and, on the other hand, the outside wall area being compressed at the places where the web is closest to the lateral edge. Similar thickness variations in the rim chamber occur for other reasons in the web multiple panels which are produced according to the previously referenced German Patent Document DE-OS No. 27 34 464. Unlike the thickness variations produced by the prior art technique, however, the webs in the web multiple panels according to this invention are always undulated in the same direction, which results in improved crosswise stiffness. Moreover, the outside wall areas between the web attachments are not stretched and are of uniform thickness.

In comparison with the usual web multiple panels with webs that run straight, the crosswise stiffness of the panels according to this invention is clearly enhanced. This effect increases with the amplitude of the undulation.

It is essential for the process of this invention that the hollow extrudate in the area of the mold channel where the friction forces act crosswise to the extrusion direction be above its softening temperature so that the hollow extrudated is thermoplastically deformable. The deformation of the plastic in the plastic area results in only slight orientations and restoring forces. Accordingly, the change of shape, once produced, is largely retained unless outside forces are applied.

The process of the invention is feasible with all thermoplastic material which, in thermoplastic state, can be extruded in slotted dies of the usual design to form a hollow extrudate of the shape described and which can be calibrated and cooled in a mold channel. These plastic materials include extrusion compounds of poly(methylmethacrylate), polycarbonate, polyvinyl chloride, polypropylene, polystyrene, and the like.

DETAILED DESCRIPTION OF THE PRESENTLY PREFERRED EMBODIMENTS

Figure 1:
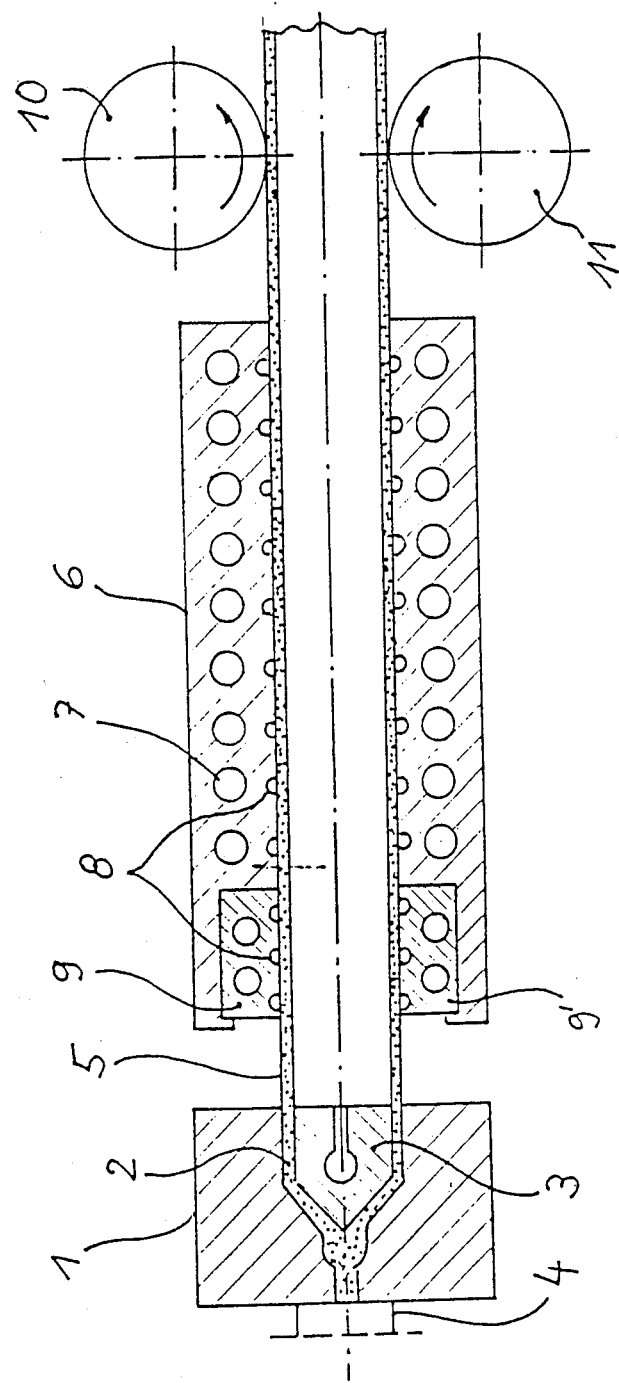
FIG. 1 shows a cross-section through an extrusion installation according to the invention with movable mold channel sections.

FIG. 1 shows a slotted die 1 having a die slot 2. A series of core pieces 3 are installed in the die slot 2 for forming hollow chambers in the extrudate 5. The hollow chambers are separated from one another by webs on each side of each core piece 3 outside of the plane of FIG. 1. The core pieces 3 can have a rectangular, triangular, or trapezoidal cross-section, depending on the desired shape of the hollow chambers. An extruder 4 is connected to the slotted die 1.

Hollow extrudate 5, extruded from the slotted die 1, goes into a mold channel 6. The mold channel 6 is advantageously placed a distance of a few millimeters, as a rule 5 to 50 millimeters, preferably 10 to 20 millimeters, from the slotted die 1. The mold channel 6 can be cooled, for example, by a coolant flowing in line 7. The hollow extrudate 5 is kept in contact with the mold channel 6 by a gas pressure that is higher than the pressure in the mold channel 6. The gas pressure can be produced by super-atmospheric pressure or, more advantageously, by a low pressure in the mold channel 6. In the embodiment with movable sections, the sidewalls of an otherwise stationary mold channel 6 are placed throughout in stationary positions. Preferably a vacuum mold channel is used, which in the mold walls and sidewalls comprises grooves 8 that can be evacuated. The sidewalls are not shown in FIG. 1, but it is to be understood that the upper and lower mold channel walls are connected both above and below the plane of FIG. 1.

A movable section 9 or 9' of the wall of the mold channel 6 is on at least one side, preferably on both sides, of the hollow extrudate 5 at the upstream end of the mold channel 6. The direction of movement of the movable sections 9, 9' is perpendicular to the plane of FIG. 1. Any rhythmically operating drive can be used for movement of movable sections 9 or 9'. For example, a rhythmically controlled hydraulic system or an eccentric gear can be used. An eccentric gear produces a rate of movement increasing and decreasing according to a sine function, which results in the forming of a sine-shaped undulating path. With a uniform movement created, for example, by means of rhythmically reversing rack-and-pinion drive, an approximately zigzagged undulating path is achieved. The movement of the mold channel sections can optionally be interrupted at the end of mid points, as a result of which a more box- or step- shaped undulating path is produced.

According to another embodiment of the process, the friction forces acting on the hollow extrudate 5 are produced by a relative movement of the entire mold channel 6 in relation to the slotted die 1. In this case, the mold channel 6 is made to be movable in a rhythmically alternating direction crosswise to the extrusion direction. This embodiment of the process has the advantage that it is possible to use a conventional mold channel without movable parts.

The relative movement between the slotted die 1 and the mold channel 6 can optionally be so made that the slotted die 1 is moved back and forth in front of a stationary mold channel 6. Alternatively, the slotted die 1 can be made stationary, and the mold channel 6 can be moved back and forth. The latter possibility is preferred. The part of the device that is made to be movable is preferably moved by an eccentric drive on a roller bearing. As a rule either the slotted die 1 with the extruder 4 feeding it or the mold channel 6 with a cooling grate optionally connected to it and with a discharge device must be moved back and forth as an integrated structural unit. If the hollow extrudate 5 is no wider than 200 to 300 millimeters, or if the hollow extrudate 5 consists of a thin-walled elastic plastic, the discharge device can be placed stationarily a sufficient distance from the downstream end of the mold channel 6, and only the mold channel 6 need be moved back and forth. On the other hand, if the hollow extrudate 5 is notably wider, its elasticity is not sufficient in the case of brittle material and buckling-resistant geometry to withstand the relative movement without breaking.

Figure 2:
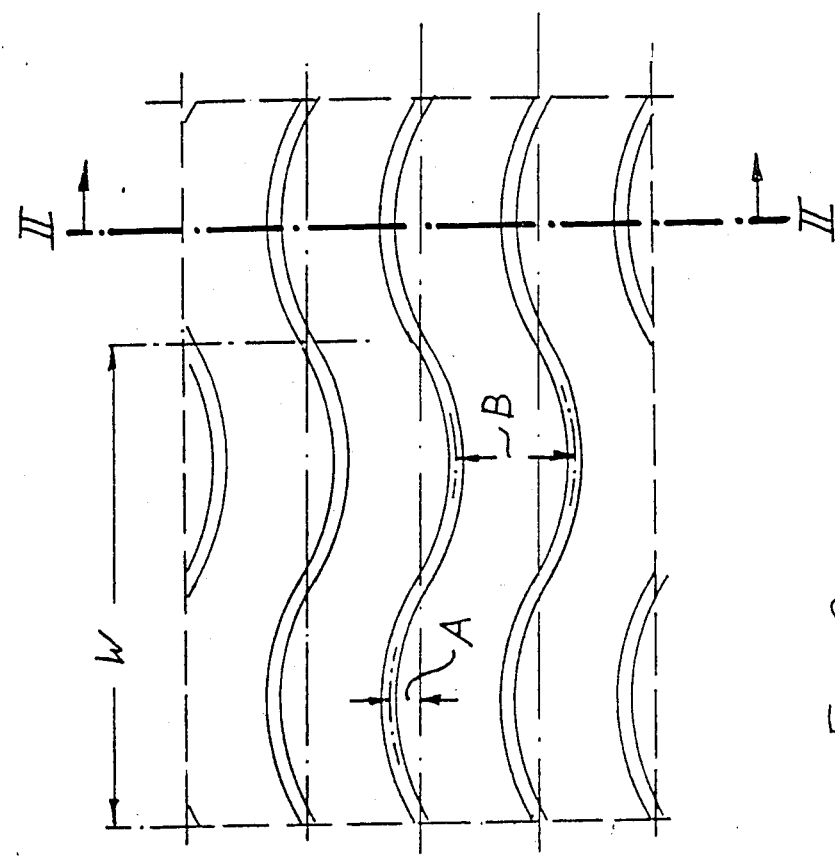
FIG. 2 shows a longitudinal section through a web multiple panel according to the invention.

It is advantageous for the stiffening of the web multiple panel if the undulation amplitude A (shown in FIG. 2) is 0.5 to 2 times the average distance B between the webs, which in practice is generally 10 to 30 millimeters. Since a certain slip always occurs between the movement of the wall of the mold channel 6 and the movement of the hollow extrudate 5, the mold channel walls or hollow extrudate 5 itself can be movable by a greater amount—for example, 0.5 to 4 times the average distance between the webs or the average distance of the space between the core pieces 3 in the slotted die 1.

If the amplitude of relative movement is large, there is the danger that the side edges of the hollow extrudate 5 will come loose from the side walls of the mold channel 6, which can result in the mostly undesirable forming of an undulated rim. This danger can be met by an increased vacuum in the mold channel 6 or by excess width of the slotted die 1. If the slotted die 1 is a half to a full amplitude wider than the mold channel 6, separations of the side edges can be almost completely suppressed.

The cooled hollow extruded 5 is removed from mold channel 6 by a removal device—for example, a pair of rolls 10, 11. The desired curve path is achieved by the removal rate being brought to an advantageous relation with the rhythm of the alternation of direction of the mold channel wall sections. An undulation length W of 1 to 20 times the average distance B between the web is achieved if the rhythmic alternation of the direction of the frictional forces is made in each case after removal of an extruded piece the length of which corresponds to about 0.5 to 10 times the average distance B between the webs.

Figure 3:
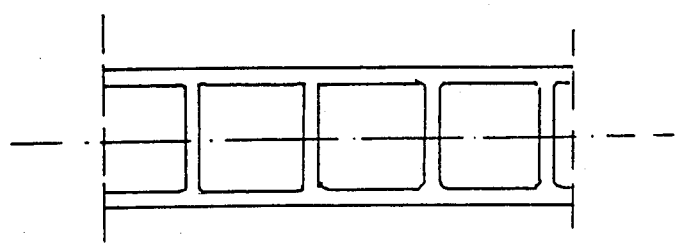
FIG. 3 shows a cross-section through the panel shown in FIG. 2 along line II—II of FIG. 2.
Figure 6:
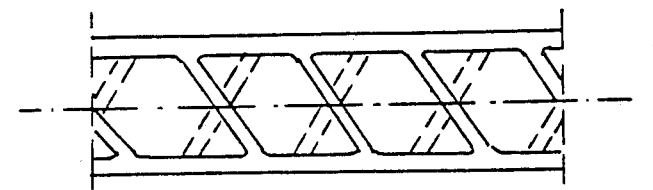
FIGS. 5 and 6 show cross-sections through the panel according to FIG. 4 along lines IV—IV and III—III, respectively. The projections of the twisted webs on the sectional plane are indicated by broken lines.
Figure 5:
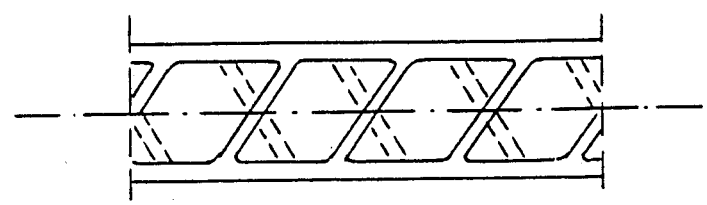
Figure 4:
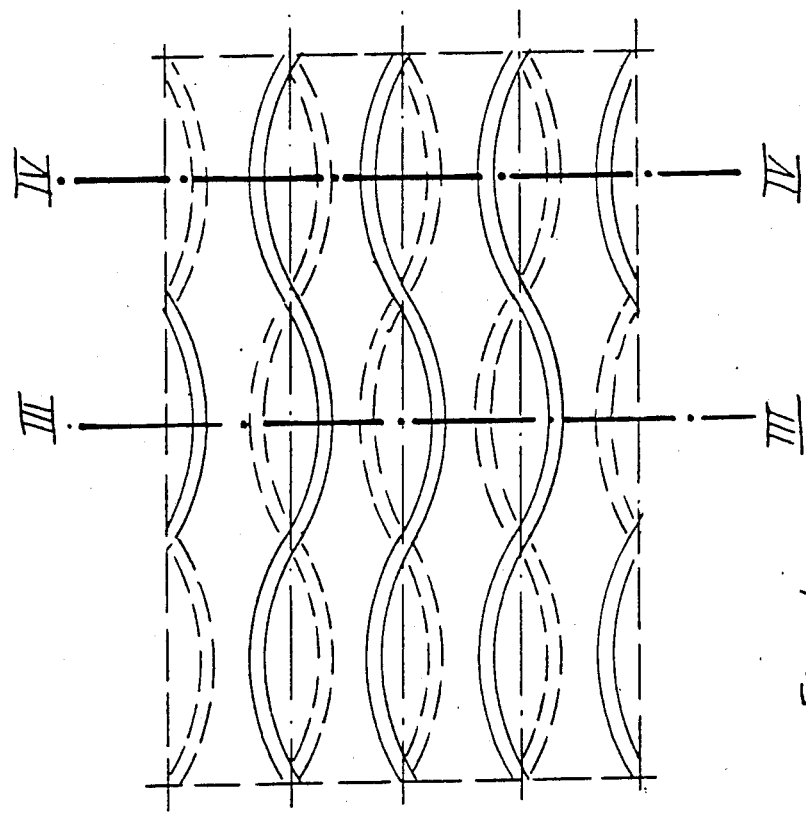
FIG. 4 shows, in top view, a second embodiment of a web multiple panel according to the invention with twisted webs. The attachment of the webs to the upper outside walls are shown with solid lines, and the attachment of the webs to the lower outside walls are shown with broken lines.
Figure 7:
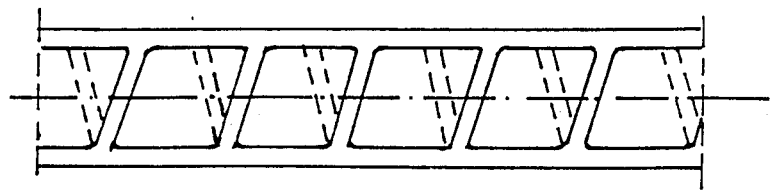
FIG. 7 shows a cross-section through a third embodiment of a web multiple panel according to the invention in the same mode of representation as FIG. 5.

If friction forces act only on one side of the hollow extrudate 5, the attachment lines of the webs on that side is undulated, while the web attachments on the other side remain straight. In this way, a web panel with a cross-section shown in FIG. 7 is obtained. Preferably friction forces act on both sides of the hollow extrudate. If the friction forces always act in the same direction, a web panel with a cross-section shown in FIG. 3 is produced. This is achieved in the simplest way by movable sections 9 and 9' being mechanically coupled and rhythmically moved with the same drive or by the mold channel 6 being rhythmically moved as a whole. On the other hand, if the mold channel walls are moved with a drive always working in the opposite direction, the attachment lines of the webs to the upper and lower outside walls are undulated in the opposite way, as shown in FIG. 4 in top view and in FIGS. 5 and 6 in cross-section.

WORKIING EXAMPLE

A slotted die 1 is fed a thermoplastic polycarbonate molded material from an extruder 4 with a 60-millimeter screw diameter. The temperature of the material is 270° C., and the die temperature is 260° C. The hollow extrudate 5 is discharged at a rate of 1 meter per minute. The width of the hollow extrudate 5 is 250 millimeters, and the height of the hollow extrudate is 16 millimeters. The hollow extrudate 5 has 16 hollow chambers with a rectangular cross-section. The wall thickness of the outside walls and of the webs is almost the same and is about 1 millimeter. The extruded mass is introduced into a 500 millimeter mold channel 6 20 millimeters downstream of slotted die 1. The movable sections 9, 9' are located in the first 100 millimeters of the mold channel 6. The movable sections 9, 9' are moved back and forth in the same direction by an eccentric drive crosswise to the extrusion direction.

The temperature of the movable section 9, 9' is set at 100° C. The temperature of the rest of the mold channel 6 is 50° C. A vacuum of 500 WG is applied to the movable and stationary parts of the mold channel 6. The period of the oscillatory movement of the movable sections 9, 9' is 6 seconds. The amplitude of the movement of movable section 9, 9' is 15 millimeters, corresponding to an eccentric wheel diameter of 30 millimeters. The hollow chamber profile panels discharged from the mold channel 6 have sine-shaped undulated webs. The amplitude A of the resulting sine function is 8 millimeters. The period W is 100 millimeters. The cross-section of the hollow chamber panel is as shown in FIG. 3.

Figure 8:
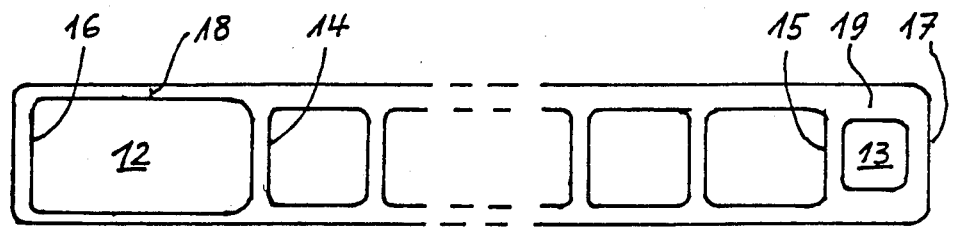
FIG. 8 shows a cross-section through the rims of the panels shown in FIGS. 2 and 3.

The outside walls, as shown in FIG. 8, are made thinner (18) by stretching or thicker (19) by compression than the rest of the panel area in the area of rim chambers 12, 13 depending on the distance of the first inner web 14 or 15 from the rim web 16 or 17.

In another embodiment of the process, the mold channel 6 is made movable and is moved back and forth crosswise to the extrusion direction by an eccentric drive. The rest of the process conditions are as described above.

The hollow chamber profile panels discharged from the mold channel 6 have the same sine-shaped undulating path of the webs as in the process described above.

What is claimed as new and desired to be secured by Letters Patent of the United States is:

1. A process for the production of extruded web multiple panels comprising two planar outside walls and a plurality of at least generally parallel webs that connect the two planar outside walls to one another and that undulate in the extrusion direction, said process comprising the steps of:
   (a) extruding a thermoplastic material through a slotted die which has a slot containing longitudinally spaced core pieces, the spaces between said longitudinally spaced core pieces forming nonundulated webs between the outside walls of a hollow extrudate, and then
   (b) applying friction forces to the planar exterior surface of at least one of the outside walls of the hollow extrudate in rhythmically alternating directions crosswise to the direction of extrusion of the hollow extrudate in an area in which the hollow extrudate is still above its softening temperature.

2. A process as in claim 1, wherein the friction forces are produced by a wall movement of a mold channel running crosswise to the extrusion direction.

3. A process as in claim 2, wherein the friction forces are produced by a crosswise movement of the entire mold channel.

4. A process as in claim 2, wherein the friction forces are produced by a crosswise movement of at least one part of a mold channel wall which is at the upstream end of the mold channel.

5. A process as in claim 1, wherein the friction forces act on the exterior surfaces of both outside walls of the hollow extrudate.

6. A process as in claim 5, wherein the friction forces acting on the two outside walls alternate in the same rhythm and always work in the same direction.

7. A process as in claim 5, wherein the friction forces acting on the two outside walls alternate in the same rhythm and always work in the opposite direction.

8. A process as in claim 1, wherein the length of the rhythmic movement of the friction forces corresponds to 0.5 to 10 times the average distance between the webs.

9. A process as in claim 1, wherein a gas pressure is maintained in the interior of the hollow extrudate which is higher than the pressure which acts on the outside of the hollow extrudate.

* * * * *